(12) United States Patent
Nelson et al.

(10) Patent No.: US 6,237,240 B1
(45) Date of Patent: May 29, 2001

(54) TEMPLATE FOR CREATING A LAYERED PATTERN

(75) Inventors: Toni Nelson, Placentia; Beth Reames, Orange, both of CA (US)

(73) Assignee: EK Success, Ltd., NJ (US)

( * ) Notice: Subject to any disclaimer, the term of this patent is extended or adjusted under 35 U.S.C. 154(b) by 0 days.

(21) Appl. No.: 09/520,462

(22) Filed: Mar. 8, 2000

Related U.S. Application Data

(62) Division of application No. 09/109,469, filed on Jul. 2, 1998, now Pat. No. 6,112,425.

(51) Int. Cl.[7] .............................. B43L 13/20; G09B 11/04
(52) U.S. Cl. ................................. 33/566; 33/563; 434/85
(58) Field of Search ............................. 33/562, 563, 564, 33/565, 566, 1 B; 434/84, 85, 87, 88, 91

(56) References Cited

U.S. PATENT DOCUMENTS

| | | | | |
|---|---|---|---|---|
| 1,358,572 | * | 11/1920 | Poole | 33/563 |
| 1,541,480 | * | 6/1925 | Compton et al. | 33/563 |
| 2,444,860 | * | 7/1948 | Summer | 434/87 |
| 2,579,857 | * | 12/1951 | Premo | 33/565 |
| 3,633,286 | * | 1/1972 | Maurer | 33/563 |
| 5,795,154 | * | 8/1998 | Woods | 434/87 |
| 6,112,425 | * | 9/2000 | Nelson et al. | 33/566 |

* cited by examiner

Primary Examiner—Christopher W. Fulton
(74) Attorney, Agent, or Firm—Sofer & Haroun, LLP

(57) ABSTRACT

A template for guiding a writing or cutting implement which comprises a plurality of patterns along its outer edges. In one embodiment, the template has four outer edges, each comprising a different pattern. The template further comprises a plurality of voids or cut-outs defined by shape-defining edges, disposed within the face of the template. The template further comprises a plurality of corner hole edges, center hole edges and rectangular marker hole edges for facilitating the positioning of the template on to a transfer sheet. Another embodiment of the template includes a layering system, designed to enable stenciling of a unique layered pattern. The layering system comprises a plurality of sets of voids or cut-outs defined by shape-defining edges, each set having a plurality of marker holes associated therewith. Each set of shapes is stenciled after being successively aligned with a marked drawing spot, and a layered effect is created by stenciling only that portion of each shape from a set which does not overlap any shapes from a previously stenciled set.

14 Claims, 8 Drawing Sheets

TEMPLATE FOR CREATING A LAYERED PATTERN

RELATED APPLICATIONS

This application is a divisional of Applicant's U.S. patent application Ser. No. 09/109,469 filed Jul. 2, 1998 , now U.S. Pat. No. 6,112,425.

FIELD OF THE INVENTION

This invention relates generally to art supplies, and more particularly to templates for stenciling borders and corners.

BACKGROUND OF THE INVENTION

Template stencils are well-known in the art as guides for artists who seek to draw or cut pre-determined shapes. A template usually comprises a semi-rigid piece of plastic, having a small thickness. The template is placed upon a sheet desired to be drawn upon or cut (hereinafter "a transfer sheet"). The face of the template can have a variety of different voids or cut-outs. In addition, the outer edges of the templates are often used as additional guides for the user. The interior cut-outs are given their shape by the interior edges of the template, which guide the writing or cutting instrument of a user along the path proscribed by the edge of the cut-out. The user draws or cuts along the outer or interior edges of the template and a drawn line or a cut line is created on the transfer sheet coinciding with the shape or pattern which the outer or interior edge of the template possessed.

It is typically a desired attribute of a stencil template to provide, without increasing the relative size of a stencil template, the greatest variety of shapes possible for the user. An increase in efficiency will exist if a single stencil template can provide a user with numerous shapes and patterns to implement. Therefore, as much of the template as possible should consist of outer and interior edges for the user to be guided by. However, the stencil must also retain its semi-rigidity so as not to be easily broken during normal usage and not to have its outer or interior edges deflect, and thereby cause the writing or cutting instrument to deviate from the edge's proscribed path, if the user's writing or cutting instrument pushes against the edge during usage. Therefore, a balance must be struck to provide the user with the maximum number of edges which define shapes or patterns while still retaining the semi-rigidity of the template.

Prior art templates usually provide means for aligning the template on the transfer sheet. The alignment guides which are commonly used consist of thin lines etched or drawn on to the template. The thin lines are located on the template so as to enable the user to line up the thin lines with reference lines or points on the transfer sheet. Because the thin alignment lines are usually located on the face of the template, the template is transparent, in order for the reference points or lines on the transfer sheet to be seen by the user in order to line them up.

There exists a need for a stencil template which provides the user with a variety of edges for guiding a writing or cutting instrument. There exists a further need for positioning a template on a transfer sheet so as to permit an outer or interior edge of the template to be placed in a pre-determined position relative to the transfer sheet.

SUMMARY OF THE INVENTION

A template for guiding a writing or cutting implement which comprises a plurality of patterns along its outer edges. In one embodiment, the template has four outer edges, each comprising a different pattern. The template further comprises a plurality of voids or cut-outs defined by shape-defining edges, disposed within the face of the template. The template further comprises a plurality of corner hole edges, center hole edges and rectangular marker hole edges for facilitating the positioning of the template on to a transfer sheet. The corner hole edges, center hole edges and rectangular marker hole edges are located on the face of the template so as to permit the edges of the transfer sheet or markings on the transfer sheet to be utilized to help facilitate the positioning of the template.

A further embodiment of the present invention includes a layering system, designed to enable stenciling of a unique layered pattern. The layering system comprises a plurality of sets of voids or cut-outs defined by shape-defining edges. Each set further comprises a plurality of marker holes associated therewith, in order to create a marked drawing spot for alignment during the layering process. Using the marker holes, each set is successively aligned by positioning the marker holes associated with that set on the same marked drawing spot, in order to layer a stenciled image from that set onto previously stenciled images from other sets. A layered effect is created by stenciling only that portion of each shape from a set which does not overlap any shapes from a previously stenciled set. This creates a combined image with shapes from one or more sets of the layering system. Preferably, the shapes of each set are specially positioned to form, when successively aligned and layered together, a pre-determined pattern, such as an interconnected design of layered geometric shapes.

BRIEF DESCRIPTION OF THE DRAWINGS

The present invention will be further understood from the following description with reference to the accompanying drawings, in which.

DETAILED DESCRIPTION OF THE INVENTION

Figure 1:
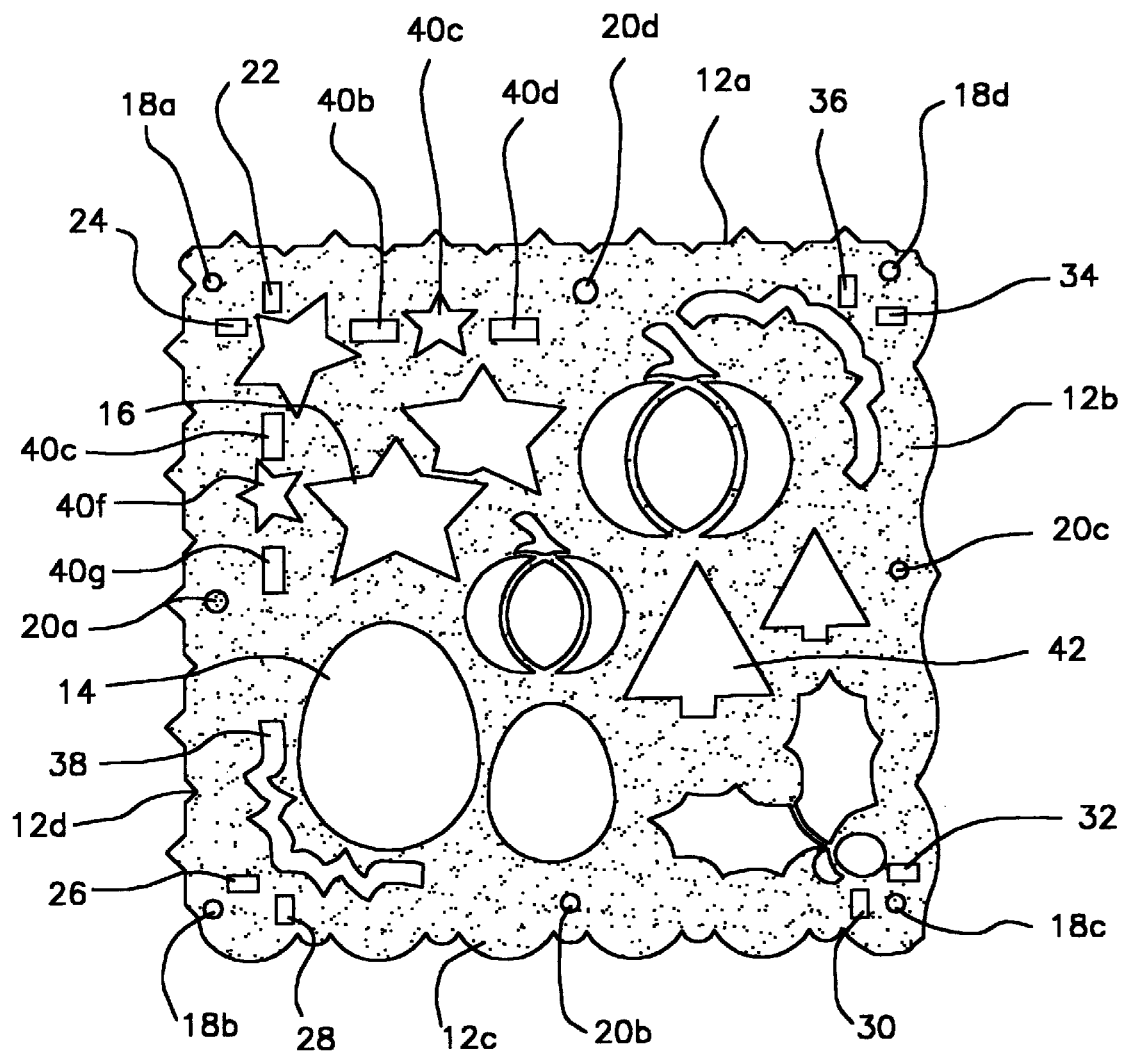
FIG. 1 illustrates a template for stencilling borders and corners, in accordance with one embodiment of the invention.

FIG. 1 illustrates one example of the preferred embodiment of the present invention. A template 10 is a sheet of semi-rigid material, preferably plastic, of varying size, though preferably approximately 12" long, 12" wide and 1/32" thick. The outer edges 12a, 12b, 12c and 12d of template 10 along its width and length are not straight, but instead comprise various shapes, either geometric or decorative, which can guide a writing or cutting implement. In the preferred embodiment, each of the four outer edges has a different shape, permitting the tracing of four different border designs by the same template. As shown, edge 12a comprises a series of equally spaced, symmetrical protuberances, edge 12b comprises elongated waves, edge 12c comprises alternating large and small semi-circular shapes, while edge 12d comprises a series of equally-sized large semi-circular shapes. As is evident, there is an infinite number of patterns and shapes which can comprise the outer edges of template 10, only several of which are shown or described herein. In another embodiment, template 10 has two different shaped edges, wherein two edges have shapes which are identical to each other, and the remaining two sides have shapes which are identical with each other but which are different from the first two sides. As is evident, it is also possible that all four sides of template 10 have identical shapes, although this does not comport with the desirability to provide a variety of design ideas in a single template. Additionally, it is evident that template 10 can have more than four outer edges, thus permitting a greater number of shapes and patterns.

The face of template 10 has a plurality of discrete voids or cut-outs defined by shape-defining edges. The edges of the cut-outs comprise various shapes and sizes, but all serve the purpose of permitting a user to either trace or cut along the edge to create a shape on the transfer sheet identical with the cut-out shape. The cut-outs are preferably, though not necessarily, arranged on the face of template 10 so as to provide a variety of different shapes. At the same time, template 10 must be constructed with enough of the plastic template material between the cut-outs, and with enough of the plastic template material between the cut-outs and the template edges, so as prevent template 10 from being too flimsy or from breaking during normal usage.

It should be noted that template 10 is reversible, wherein it can be flipped over so as to enable the user to draw a mirror image of any of the shapes disposed within template 10. Template 10 shown in FIG. 1 is identical to the template 10 shown in FIG. 2, except that in FIG. 2, template 10 has been flipped over. Corner hole edge 18a, the purpose of which will be discussed more fully later, which was previously located in the upper left hand corner of template 10 in FIG. 1, is now located in the upper right hand corner of template 10 in FIG. 2. Thus, for example, edge 40a, which also will be discussed more fully later, can be located in any corner of transfer sheet 100 enabling symmetrical design patterns to be stencilled on transfer sheet 10 with only a single shape-defining edge disposed on template 10.

In FIG. 1, edge 14 of template 10 defines an egg-shaped void which enables a person to draw a symmetrical representation of an egg on transfer sheet 100 by running a writing implement along edge 14, such that the tip of the writing implement contacts transfer sheet 100 and is guided along edge 14 by the user. In another embodiment of the invention, a knife, scissor or other cutting apparatus is utilized to cut transfer sheet 100, rather than draw on it. Edge 16 of template 10 defines a star-shaped void while edge 42 defines a Christmas tree-shaped void. As shown, a plurality of edges can be disposed on template 10 in order to define a plurality of discrete shapes, only some of which are labelled herein. In addition, as is evident, an infinite variety of shape-defining edges can be disposed on template 10, only some of which are shown herein.

The face of template 10 also comprises a series of center hole edges, corner hole edges and rectangular marker hole edges. Each of these edges is utilized to position template 10 on transfer sheet 100 and ensure that the shapes created by the person using template 10 are likewise positioned on transfer sheet 100 symmetrically. While a user can utilize template 10 in any conceivable position, template 10 advantageously has means for aligning the template so as to ensure that images, when desired, will be properly centered, spaced and positioned on transfer sheet 100. Thus, while the positioning of a specific shape-defining edge is ultimately dependent upon the user's preferences, template 10 enables the user to create an image in a pre-determined spacially-aligned position relative to the transfer sheet.

As shown in FIG. 1, corner hole edge 18a is disposed in close proximity to the corner of template 10 created by edges 12a and 12d. Corner hole edge 18b is disposed in close proximity to the corner of template 10 created by edges 12d and 12c. Corner hole edge 18c is disposed in close proximity to the corner of template 10 created by edges 12c and 12b. Finally, corner hole edge 18d is disposed in close proximity to the corner of template 10 created by edges 12b and 12a. Each corner hole edge is disposed within template 10 so as to enable a user to position template 10.

Figure 2:
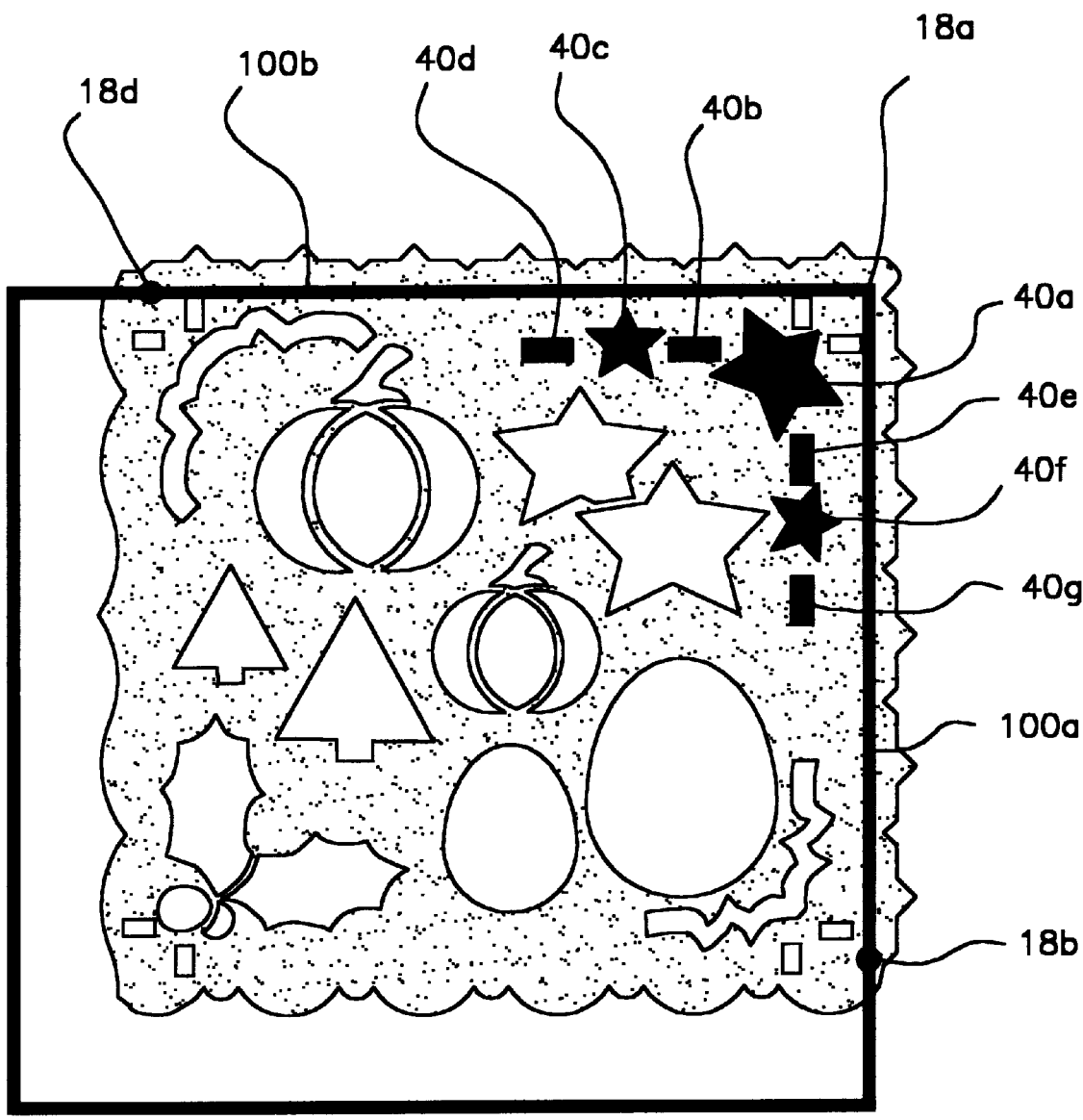
FIG. 2 illustrates a template comprising corner hole edges to position a shape-defining edge on a transfer sheet, in accordance with one embodiment of the invention.

For instance, FIG. 2 shows the corner hole edges 18a, 18b and 18d of template as utilized to position template 10 on transfer sheet 100. As shown, corner hole edges 18a, 18b, 18c and 18d form a square such that a 90 degree angle exists between lines formed by adjacent corner hole edges. In the Figure, corner hole edge 18a is placed exactly on the corner point of transfer sheet 100. Corner hole edge 18b is then lined up with edge 100a of transfer sheet 100, and corner hole edge 18d is lined up with side 100b of transfer sheet 100. With all of the corner hole edges lined up, star-shaped edge 40a and the remaining shape-defining edges which are intended to accompany edge 40a to form a complete corner stencil pattern, are properly positioned on transfer sheet 100.

In FIG. 2, the corner stencil pattern is in a predetermined spacially-aligned position when all of the images are disposed on transfer sheet 100 a great enough distance from the outer edges of transfer sheet 100 so as not to run off of the edge but a short enough distance from the outer edges of transfer sheet 100 so that the images do not significantly interfere with any writing or photographs placed in the center of transfer sheet 100. Additionally, the images are disposed on transfer sheet 100 such that rectangular shape-defining edge 40d is a distance from edge 100b of transfer sheet 100 equal to the distance that rectangle shape-defining edge 40g is from edge 100a of transfer sheet 100. For this particular pattern, the equality of distance of the edges is desirable because it enables the drawn image on transfer sheet 100 to appear symmetrically positioned in the proximity of the corner of transfer sheet 100.

Template 10 advantageously comprises a plurality of rectangular marker hole edges. In the embodiment shown in FIG. 1, template 10 comprises eight rectangular marker hole edges, all of which are disposed in close proximity to the corners of template 10. Vertically-disposed rectangular marker hole edge 22 and horizontally-disposed rectangular marker hole edge 24 are located in close proximity with the corner hole edge 18a. Vertically-disposed rectangular marker hole edge 28 and horizontally-disposed rectangular marker hole edge 26 are located in close proximity with the corner hole edge 18b. Vertically-disposed rectangular marker hole edge 30 and horizontally-disposed rectangular marker hole edge 32 are located in close proximity with the corner hole edge 18c. Vertically-disposed rectangular marker hole edge 36 and horizontally-disposed rectangular marker hole edge 34 are located in close proximity with the corner hole edge 18d. It should be noted that the use herein of the terms "verticallydisposed" and "horizontally-disposed" are arbitrary, since template 10 can be physically rotated or flipped in any position. These terms are used simply to indicate that the "vertically-disposed" edges are situated with their longer edges in one directional arrangement, while the "horizontally-disposed" edges are situated with their longer edges in another directional arrangement.

Figure 3:
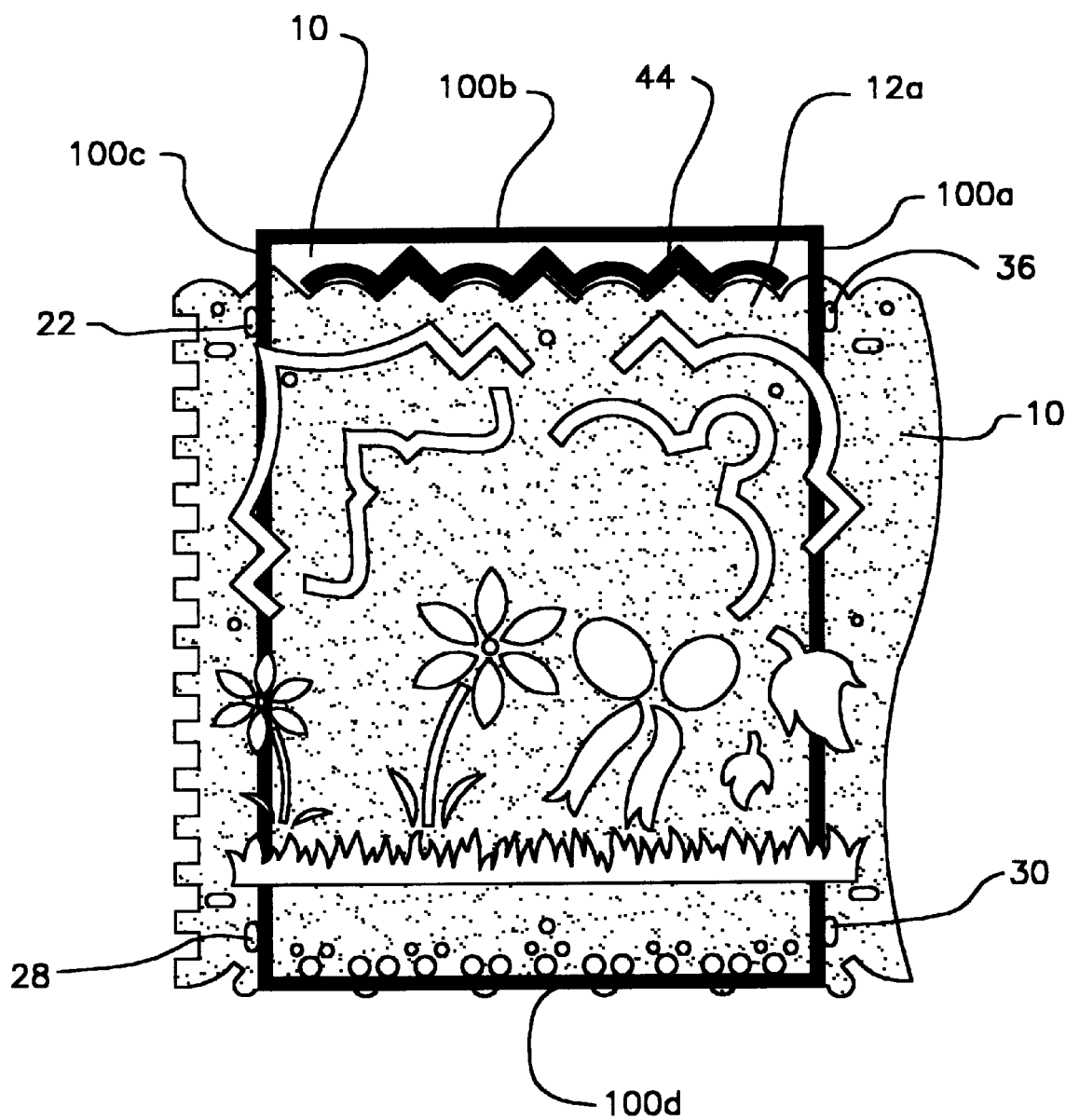
FIG. 3 illustrates a template comprising rectangular marker hole edges to position an outer edge of the template on a transfer sheet, in accordance with one embodiment o the invention.

Rectangular marker hole edges are also utilized to facilitate the positioning of template 10 on transfer sheet 100. FIG. 3 illustrates, in accordance with one embodiment of the invention, how template 10 uses the vertically-disposed rectangular marker hole edges to position template edge 12a in close proximity and spacially-aligned with edge 100b of transfer sheet 100. Rectangular marker hole edge 22 is positioned over edge 100c of transfer sheet 100 such that edge 100c is visible through rectangular marker hole edge 22. Rectangular marker hole edge 28 is positioned over edge 100c such that edge 100c is visible through rectangular marker hole edge 28. Similarly, rectangular marker hole edges 30 and 36 are positioned over edge 100a of transfer sheet 100 such that edge 100a is visible through rectangular marker hole edges 30 and 36. In this position, as shown, edge 12a of template 10 is spacially-aligned in close proximity with edge 100b of transfer sheet 100, permitting border 44 to be drawn onto transfer sheet 100. It should be noted that edge 12a can be moved closer or farther away from edge 100b, at the preference of the user, by moving template 10, so long as edge 100c stays visible within rectangular marker hole edges 22 and 28, and edge 100a stays visible within rectangular marker hole edges 30 and 36.

Advantageously, though not shown in the figures, horizontally-disposed rectangular marker hole edges 24, 26, 32 and 34 can also be utilized in the same manner to spacially-align other edges of template 10 with other edges of transfer sheet 100. In the preferred embodiment, rectangular marker hole edges are a pre-determined distance from each other within template 10, conforming to the transfer sheet size expected to be utilized with the present invention. For instance, transfer sheet 100 might be an 8½"×11" piece of paper, which is a popular size. In this case, rectangular marker hole edge 22 would be located 8½" from rectangular marker hole edge 36, and rectangular marker hole edge 28 would be located 8½" from rectangular marker hole edge 30. In this manner, edges 100a and 100c of the sheet of paper would be visible in each of the rectangular marker hole edges. Similarly, rectangular marker hole edges 24 and 26 would be located 11" from each other, and rectangular marker hole edges 32 and 34 would be located 11" from each other, so that edges 100b and 100d are visible in each of the rectangular marker hole edges.

In another embodiment of the invention, additional rectangular marker hole edges, which are not shown, exist in template 10 to permit various sizes of transfer sheet 100 to be utilized. For instance, a plurality of vertically-disposed rectangular marker hole edges can be located such that two marker holes exist at distances of, for example, 5", 8½", 11" and 14" from each other. These particular sizes are specified only because they are popular sizes for paper sheets—in fact, any sizes of sheets would be possible. In the same manner, a plurality of horizontally-disposed rectangular marker hole edges can be located at the same distances from each. Thus, the rectangular marker hole edges could be utilized to position template 10 on to transfer sheet 100 regardless of whether template 10 was flipped or reversed. It should also be noted that the present invention contemplates the use of other shapes besides rectangles for this purpose.

Figure 4:
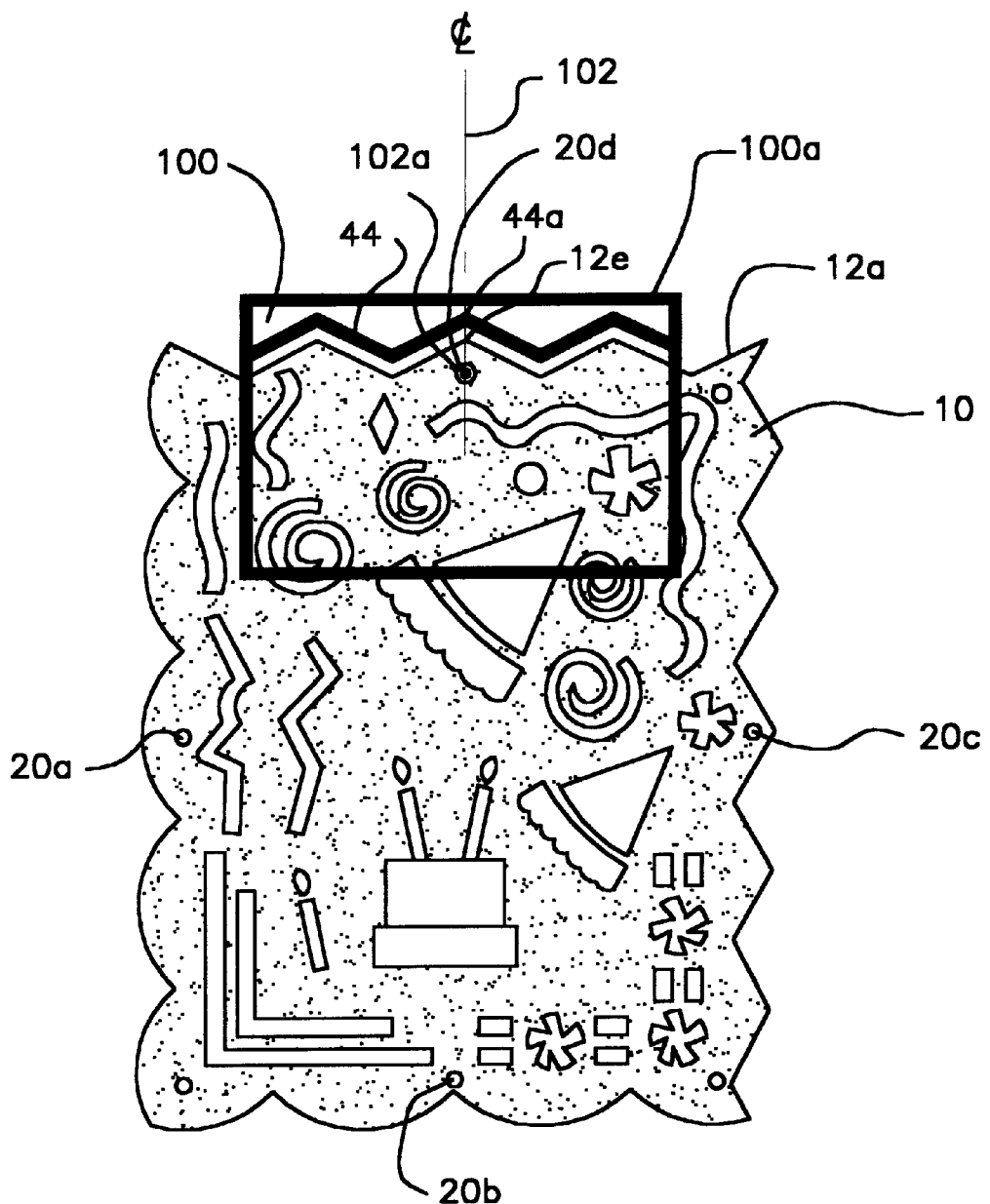
FIG. 4 illustrates a template comprising center hole edges to position an outer edge of the template on a transfer sheet, in accordance with one embodiment of the invention.

Template 10 also comprises center hole edges 20a, 20b, 20c and 20d. Center hole edges enable a user to center a design on transfer sheet 100. FIG. 4 illustrates, in accordance with one embodiment of the invention, how center hole edge 20d of the present invention is utilized to center point 12e of edge 12a of template 10 on transfer sheet 100. Center line 102 of transfer sheet 100 is known and is marked with centerline mark 102a on transfer sheet 100, advantageously in light pencil for erasure later on. Center line 102 is then lined up with center hole edge 20d such that centerline mark 102a is visible through center hole edge 20d. Center hole edge 20d is located in close proximity to and is directly vertical to centerpoint 12e of edge 12a. As shown, centerpoint 12e of edge 12a is, as a result of lining up center hole edge 20d, also lined up with centerline 102 of transfer sheet 100. Drawn line 44 can therefore be drawn onto transfer sheet 100 whereby point 44a of drawn line 44 is also located on centerline 102. With point 44a located on centerline 102 of transfer sheet 100, the pattern of drawn line 44 on the right side of centerline 102 is symmetrical with and a mirrored image of drawn line 44 on the left side of centerline 102.

According to a further embodiment, the present invention may further contain a layering system. As previously described, a layering system comprises a plurality of sets of voids or cut-outs defined by shape-defining edges, positioned to form a predetermined pattern upon completion, and a plurality of marker holes associated with each set. The plurality of marker holes are used to create a marked drawing spot for successive alignment of each set during the layering process, thus permitting a stenciled image from one set to be layered onto previously stenciled images from other sets. The layered effect is created by stenciling only that portion of each shape from a set which does not overlap any shapes from a previously stenciled set.

Figure 5:
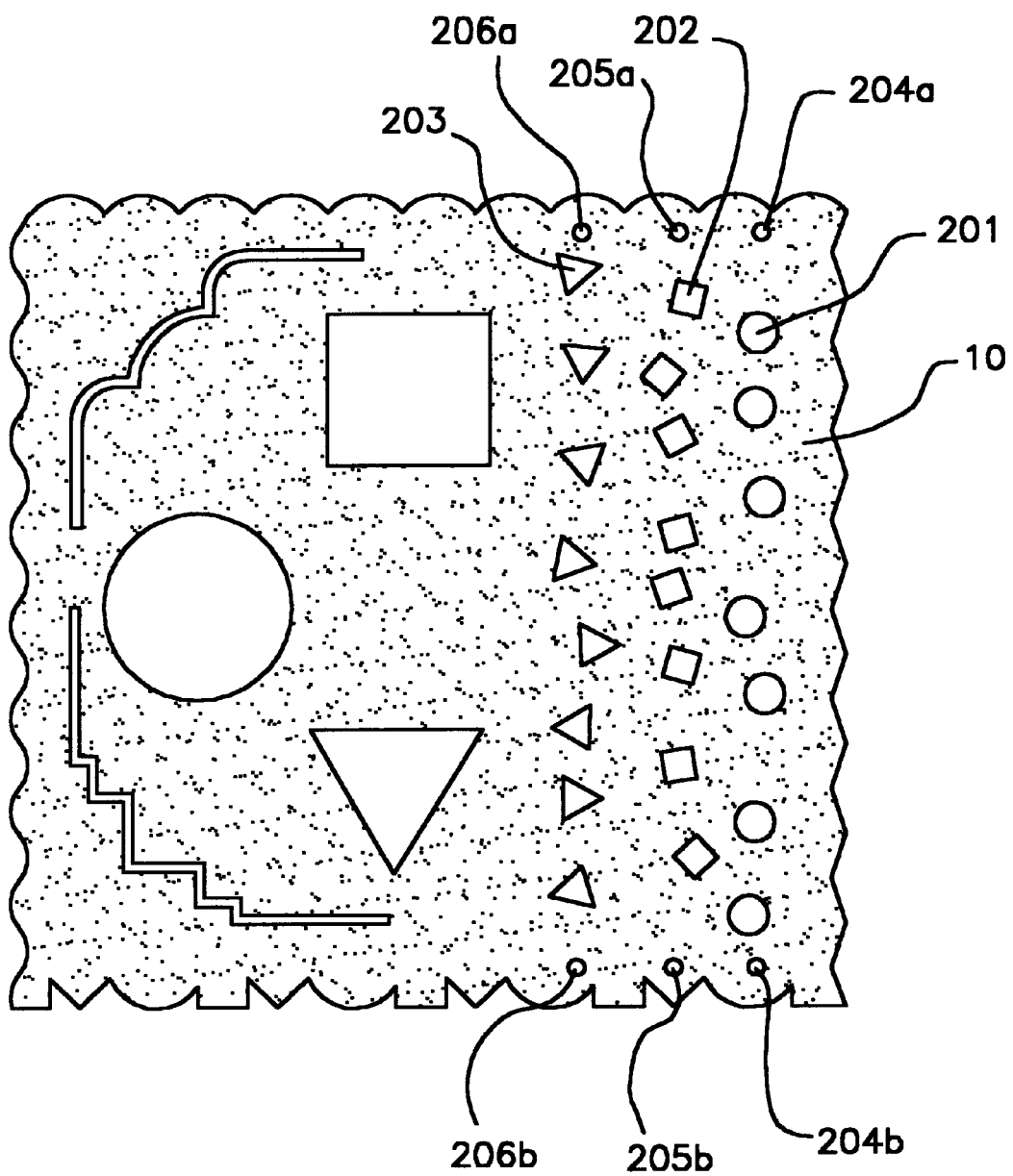
FIG. 5 illustrates a template having a layering system comprising three rows of geometric images and associated marker holes, used to create a layered pattern, in accordance with one embodiment of the invention.

According to the preferred embodiment, the shapes of each set are specially positioned to form, when successively aligned and layered together, a pre-determined pattern, such as an interconnected design of layered geometric shapes. Referring to FIG. 5, template 10 contains therein three sets, in this case rows 201, 202 and 203, of geometric shapes. Each set has a plurality of marker holes associated therewith. Row 201 has marker holes 204a and 204b, located at opposite ends of the row, associated with it. Likewise, rows 202 and 203 have marker holes 205a and 205b, and marker holes 206a and 206b, associated with them, respectively.

According to this embodiment, the first row 201 comprises an arrangement of circles, each circle variably spaced apart. The second row 202 comprises an arrangement of squares, and the third row 203 comprises an arrangement of triangles. The individual shapes arranged on each row are notably not even, but instead are specially positioned with respect to their correlating rows in order to form, when layered together, one combined interconnected S pattern, as described hereinafter.

Figure 6A:
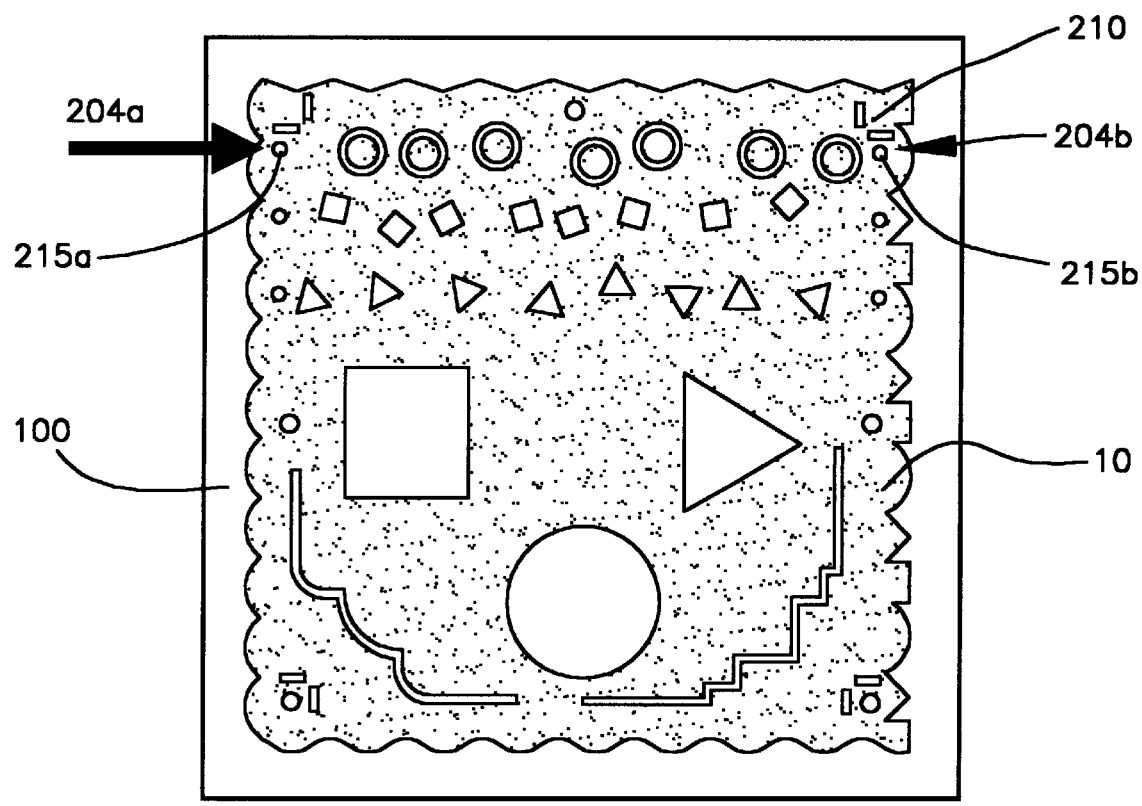
FIG. 6a illustrates the first step of a three-step layering system, in accordance with one embodiment of the invention.
Figure 6B:
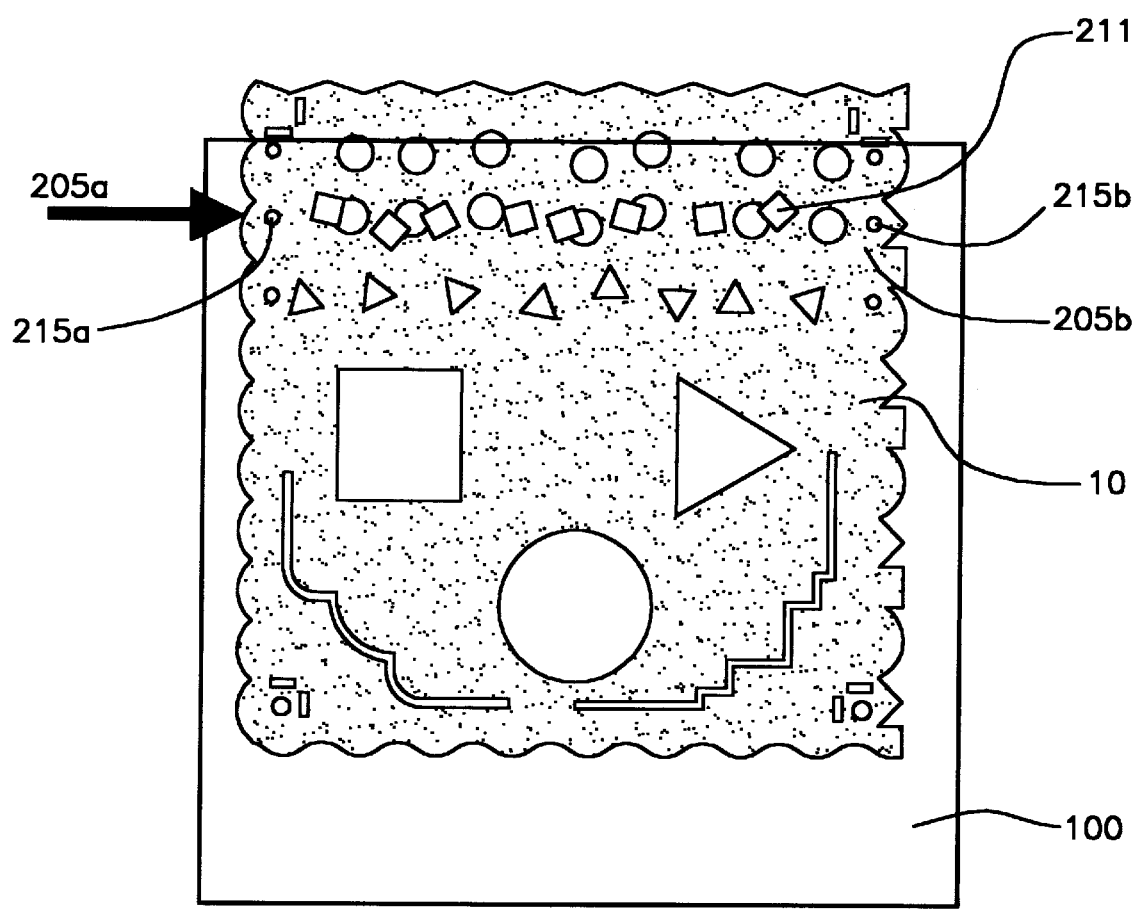
FIG. 6b illustrates the second step of a three-step layering system, in accordance with one embodiment of the invention.
Figure 6C:
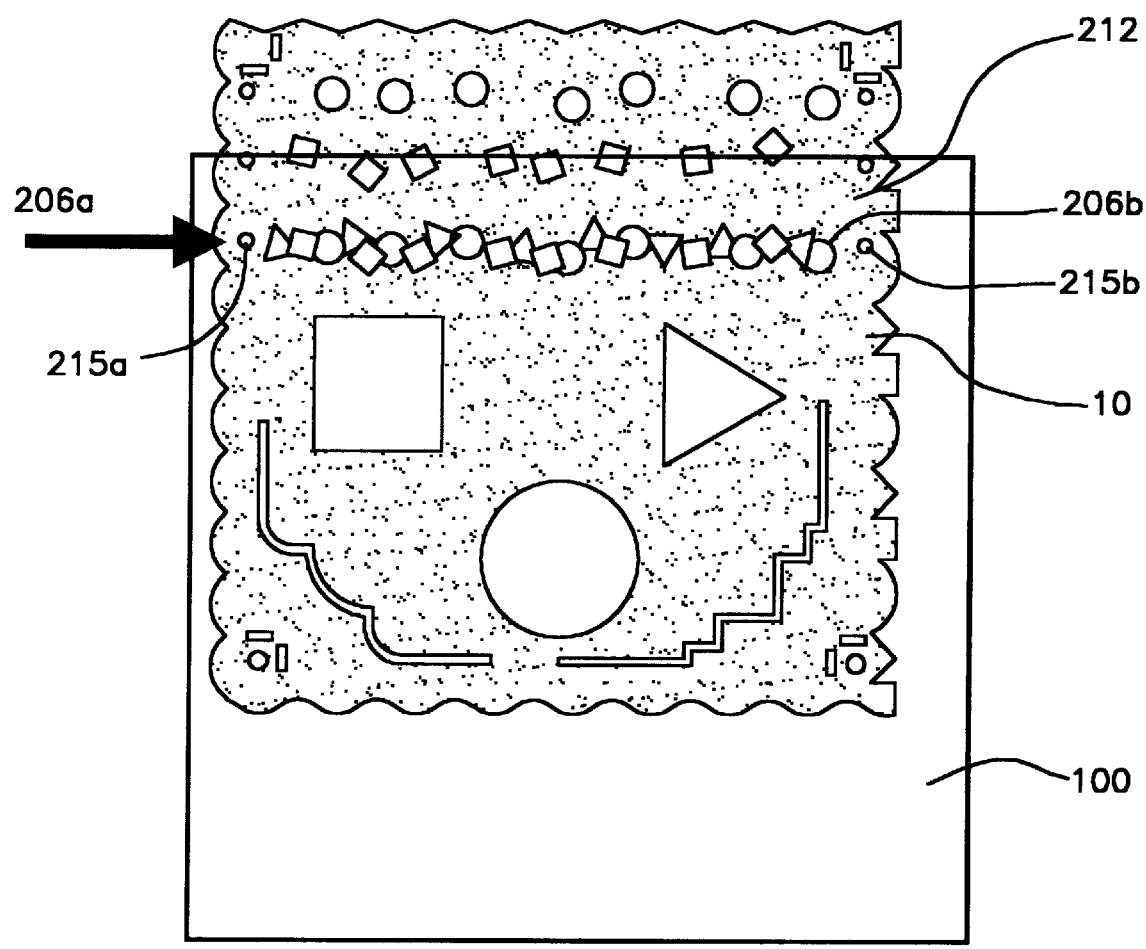
FIG. 6c illustrates the third step of a three-step layering system, in accordance with one embodiment of the invention.

The layering system of FIG. 5 has a layering means comprised of three steps, respectively illustrated in FIGS. 6a, 6b and 6c. The first step of the layering system is shown in FIG. 6a. First, template 10 is placed on transfer sheet 100 such that a first set of shapes, in this case row 201, is positioned as desired relative to transfer sheet 100. Marked drawing spots 215a and 215b are then created on transfer sheet 100, advantageously as a light pencil mark that can later be removed or covered, by inserting a writing implement through marker holes 204a and 204b. With marker holes 204a and 204b still positioned over marked drawing spots 215a and 215b respectively, the circle shapes from row 201 are stenciled onto transfer sheet 100 with a writing implement. Thus, a series of circles are now positioned on transfer sheet 100 in a visible pattern 210.

In the second step of the layering system, as shown in FIG. 6b, template 10 is adjusted so that marker holes 205a and 205b of the second row of shapes are aligned with marked drawing spots 215a and 215b, respectively. Thereafter, the square shapes of row 202 are stenciled onto transfer sheet 100 with the writing implement. In order to accomplish the layered effect, only that part of the shape is stenciled which does not overlap any previously drawn shapes. Thus, the second stenciled shapes appear to be located behind and partially hidden by the first stenciled shapes, and the combined image is positioned on transfer sheet 100 in a visible pattern 211.

In the third step of this embodiment, as shown in FIG. 6c, template 10 is further adjusted so that marker holes 206a and 206b of the third row of shapes are aligned with marked drawing spots 215a and 215b, respectively. Thereafter, the triangular shapes of row 203 are stenciled onto transfer sheet 100 with the writing implement. In order to continue the layered effect, only that part of the triangular shape is stenciled which does not overlap any previously drawn circle or square shapes. Upon completing the three steps of this embodiment, an interconnected design 212 of geometric shapes will be stenciled on transfer sheet 100.

Notably, in alternative embodiments, the layered drawing may be a series of distinct intricate drawings. For example, if not every shape from each set was traced, there may be more than one discrete images dispersed on transfer sheet 100. Additionally, the order in which each set of patterns is stenciled onto transfer sheet 100 can be varied such that different sets of images are more prominently displayed in the final design. Thus, while template 10 provides a predetermined pattern of geometric shapes as final design 212, the user can customize design 212 as desired.

After the final step, marked drawing spots 215a and 215b may either be erased or covered with a random doodle or other pattern. Moreover, the geometric shapes of this embodiment, may be filled thereafter with various doodling. For example, the squares can be drawn as dice or gift-wrapped presents, the circles as basketballs or candy, and the triangles as hats, etc. Other embodiments with patterns different than these geometric shapes can be similarly created. The finished layered pattern can be used as a border or for any other purpose.

It is understood that the number of rows in the layering system may be increased or decreased to two rows, four rows, etc., and the frequency and positioning of the patterns may be altered as well. In one embodiment (not shown), a single row of shapes could be layered by positioning the shapes such that, by flipping and rotating template 10, a pre-determined layered pattern is created. Additionally, each row need not have the same pattern dispersed throughout, nor need there be only simple patterns, such as circles, squares, and triangles.

While there has been shown and described particular embodiments of the invention, it will be obvious to those skilled in the art that changes and modifications can be made therein without departing from the invention, and therefore, the appended claims shall be understood to cover all such changes and modifications as fall within the true spirit and scope of the invention.

We claim:

1. A template for guiding a writing implement on a transfer sheet having a border region, said template comprising:
    a plurality of outer edges;
    a first set of similar shape-defining edges disposed between said outer edges of said template;
    a first set of marker holes associated with said first set of shape-defining edges positioned so that when said template is placed on said transfer sheet, said first set of marker holes and said first set of shape-defining edges are marked by said writing implement and create a first set of marker spots and a first set of shape-defined markings;
    a second set similar of shape-defining edges disposed between said outer edges of said template, said first set of similar shape defining edges being different from said second set of similar shape defining edges; and
    a second set of marker holes associated with said second set of similar shape-defining edges positioned so that when said second set of marker holes are aligned on said first set of marker spots said second set of similar shape-defining edges are marked by said writing implement creating a second set of similar shape defined markings thus creating a layered, multi-shaped pattern on said transfer sheet such that when said first set of similar shape defining edges disposed between said outer edges of said template are marked by said writing implement and when said second set of similar shape defining edges disposed between said outer edges of said template are also marked by said writing implement, the resulting first and second shape defined markings form a continuous interconnected border of alternating first and second shape defining edges across said border region of said transfer sheet.

2. The template as set forth in claim 1, further comprising:
    a third set of shape-defining edges disposed between said outer edges of said template;
    and
    a third set of marker holes associated with said third set of shape-defining edges positioned so that when said template is placed on the transfer sheet and said third set of marker holes are aligned on said first set of marker spots, said third set of shape-defining edges are marked by the writing implement to create a layered, multi-shaped pattern on said transfer sheet.

3. The template of claim 2, wherein the multi-shaped pattern created by said first, second and third sets of shape-defining edges are interconnected.

4. The template of claim 2, wherein the third set of shape-defining edges are triangles.

5. The template of claim 1, wherein the first set of shape-defining edges are circles.

6. The template of claim 1, wherein the second set of shape-defining edges are squares.

7. The template of claim 1, wherein the template is fabricated out of a plastic material.

8. The template of claim 1, wherein said plurality of outer edges further comprises a first outer edge having a shape which is different from a shape of a second outer edge.

9. The template of claim 8, wherein said plurality of outer edges further comprises a third outer edge having a shape which is different from said shapes of said first and second outer edges.

10. The template of claim 9, wherein said plurality of outer edges firther comprises a fourth outer edge having a shape which is different from said shapes of said first, second and third outer edges.

11. The template of claim 1 wherein said first set of shape defining edges comprise a plurality of identical shapes disposed in a substantially linear formation, wherein each said shape defining edge in said first set of shape defining edges are separated by a gap of substantially equal distance.

12. The template of claim 11 wherein each said shape defining edge of said second set of shape defining edges is disposed on said template such that it is substantially aligned with one of said gaps between said shape defining edges of said first set of shape defining edges.

13. The template of claim 11 wherein each said shape defining edge of said first set of shape defining edges is disposed on said template such that it is substantially aligned with one of said gaps between said shape defining edges of said second set of shape defining edges.

14. The template of claim 1 wherein said second set of shape defining edges comprise a plurality of identical shapes disposed in a substantially linear formation, wherein each said shape defining edge in said second set of shape defining edges are separated by a gap of substantially equal distance.

\* \* \* \* \*